Jan. 28, 1941.  W. ERNST  2,230,055
SELF-CENTERING PUMP CONTROL MECHANISM
Filed Oct. 23, 1939  2 Sheets-Sheet 1
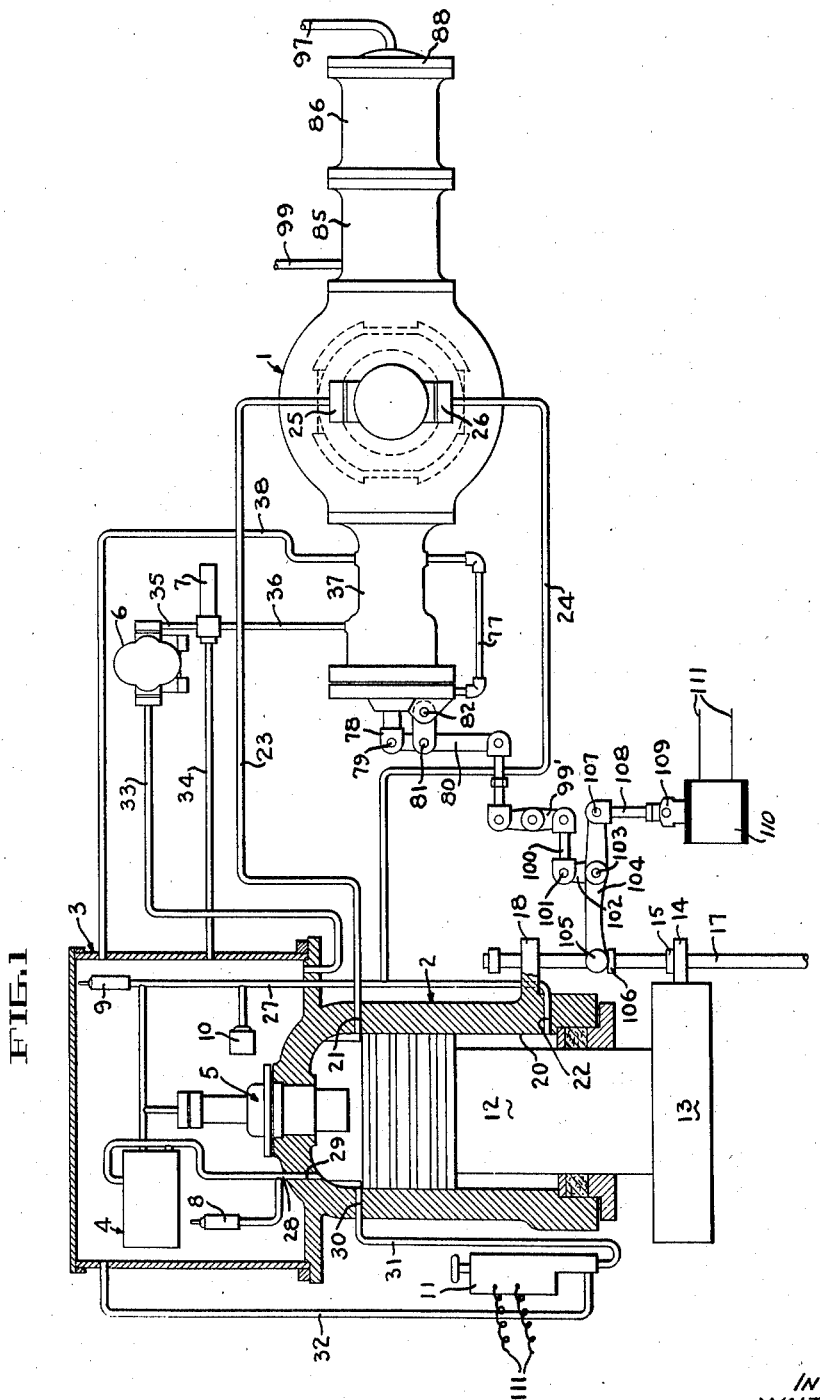
INVENTOR
WALTER ERNST
BY
Toulmin & Toulmin
ATTORNEYS

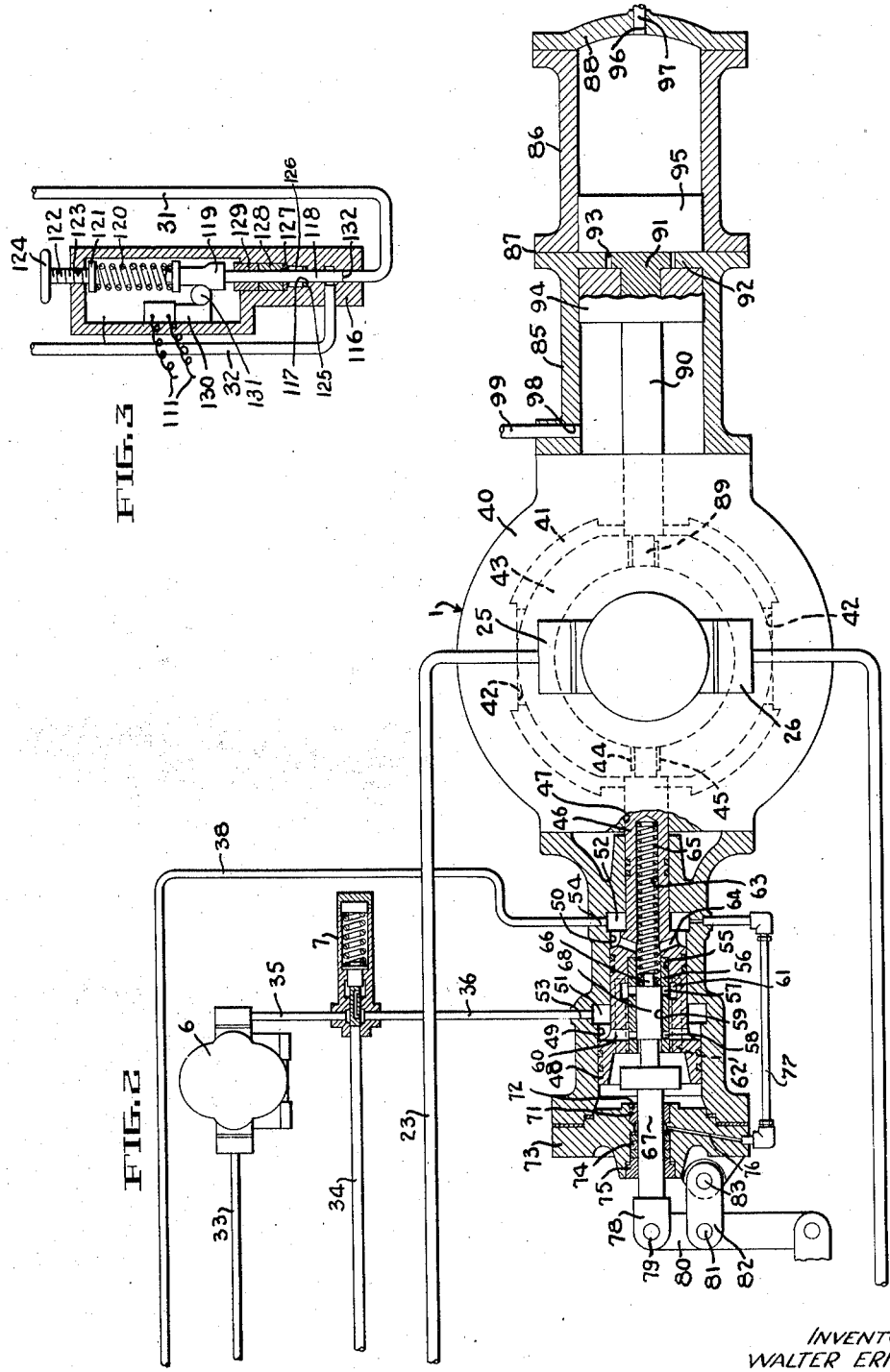

Patented Jan. 28, 1941

2,230,055

UNITED STATES PATENT OFFICE 2,230,055

SELF-CENTERING PUMP CONTROL MECHANISM

Walter Ernst, Mount Gilead, Ohio, assignor to The Hydraulic Development Corp. Inc., Wilmington, Del., a corporation of Delaware Application October 23, 1939, Serial No. 300,732

8 Claims. (Cl. 103—38)

This invention relates to hydraulic machinery, and in particular, to control devices and safety devices for hydraulic pump circuits.

Hitherto, when variable delivery pumps were used in hydraulic press circuits, a failure of power would terminate delivery of pressure fluid to the main plunger, which would then start to drop by gravity, compressing the fluid beneath it and forcing the pressure fluid thus produced into the pump, causing the latter to act as a motor. Even where the main pump was in a neutral position at the time of the power failure, the pressure of the fluid thus produced by the weight of the platen and pressing plunger has been sufficient to force the pump onto stroke, and then to drive it backward like a motor. The result of such operation was to cause the press platen to coast downwardly at a rapid speed, thereby creating a hazard for the operator, whose hands may be in the press at the moment this occurred. Furthermore, hydraulic failures hitherto have also caused a similar effect by the failure of a relief valve or a hydraulic line, so that the control mechanism failed to operate properly.

One object of this invention is to provide a hydraulic pump circuit including a control device for attachment to a servomotor-controlled hydraulic pump, and operative to shift the control member thereof to a neutral position in the event of failure of power to the circuit.

Another object is to provide a hydraulic pump and press control circuit including a device which is operative to shift the flow-control member of the pump to a neutral position or no-delivery position when the power connected to the auxiliary pump for supplying fluid to the pump servomotor, or the power for operating the pump itself, is interrupted, thereby preventing the operation of the pump as a motor and the consequent coasting down of the press platen under its own weight.

Another object is to provide a variable delivery hydraulic pump with a flow-control member adapted to be shifted by a servomotor controlled by a valve, the servomotor and valve being arranged adjacent each other and amplified by a centering device which becomes operative upon the failure of power to the pump or servomotor to shift the flow-control member of the pump to a neutral position so as to stop the delivery of fluid, and hence, to prevent accidents, such as by the weight of the press platen connected thereto causing its plunger to compress the fluid in the pressing cylinder and cause the pump to act as a motor as a result of the pressure fluid supplied thereto.

These objects are attained, in brief, by providing a hydraulic or pneumatic mechanism which is placed under compression when the flow-control member is moved on either side of neutral by the servomotor so that the mechanism is adapted to return this member to neutral when pressure fluid at the servomotor fails.

Other objects and features will be apparent as the specification is perused in connection with the accompanying drawings.

In the drawings:

Figure 1 represents the layout of a hydraulic press circuit and a reversible variable delivery pump for controlling the press, together with a servomotor for controlling the pump. The press has been shown in longitudinal section.

Figure 2 is an enlarged view of a typical variable delivery pump with its servomotor attachment, and provided with the improved flow-control ring centering device which constitutes the subject of the present invention. This figure also shows a typical relief valve in section and the outline of a pilot pump.

Figure 3 is a sectional view of a typical tonnage control valve, useful in setting the lower limits of travel of the plunger in the press.

Referring to the drawings in detail, Figure 1 shows a hydraulic press circuit containing a variable delivery pump, generally designated 1, arranged to drive a press, generally designated 2, having a fluid or surge tank, generally designated 3. A main cylinder release and by-pass valve, generally designated 4, causes the pressure in the main cylinder of the press to be released at the moment a reversal of the pump 1 occurs, and also causes the discharge of the pump 1 to be temporarily by-passed through this valve 4 into the surge tank 3. The details of this valve 4 form no part of the present invention.

Also shown in the circuit of Figure 1 is a surge valve, generally designated 5, in the top of the main cylinder of the press 2 and serving to admit fluid to the main cylinder during the initial coasting of the main platen, thereby prefilling the main cylinder with fluid until the platen encounters resistance. This surge valve 5 is described in the Ernst Patent No. 1,892,568 of December 27, 1932, and its details likewise form no part of the present invention. This surge valve 5, as shown in the above-mentioned patent, is adapted to be forcibly opened upon the return stroke of the press so as to release fluid, particularly from the main cylinder of the press 2, into the surge tank 3.

The circuit shown in Figures 1 and 2 contains a pilot pump, generally designated 6, for delivery of pilot pressure fluid to the servomotor of the variable delivery pump 1. The details of the pilot pump 6 and its driving connection with the variable delivery pump 1 form no part of the present invention, and are disclosed in the Ernst Patent No. 2,168,669 of August 8, 1939. A relief valve 7 of any suitable type is connected to the pilot circuit.

Within the surge tank 3 are pressure relief valves 8 and 9 connected on opposite sides of the main cylinder and by-pass valve 4, a check valve 10 being associated with the relief valve 9. The pressure which the press exerts is controlled by a tonnage control valve, generally designated 11, and shown in longitudinal section in Figure 3. The press 2 contains a double-acting main plunger 12 attached to a platen 13, which has an arm 14 adapted to engage a collar 15 upon a control rod 17. The latter is guided by the bracket 18 projecting from the main cylinder of the press 2. The cylinder 2 is provided with a bore 20 for the reciprocation of the main plunger 12, and has ports 21 and 22 communicating therewith on opposite sides of the main plunger 12. The ports 21 and 22 are connected, respectively, to the lines 23 and 24 leading to the forward and return pressure connections 25 and 26 of the variable delivery pump 1.

A branch 27 runs from the pipe 24 to the check valve 10, the main pressure relief valve 9 and the main cylinder release and by-pass valve 4. The branch 28 continues from the valve 4 to the port 29 in the main cylinder 2, and contains the pressure relief valve 8. From the port 30 in the main cylinder, above the main plunger 12, the line 31 runs to the tonnage control valve 11, from which the line 32 leads to the surge tank 3. The pilot circuit, including the pilot pump 6 and the pilot pressure relief valve 7, includes the line 33 running from the surge tank 3 to the pilot pump 6, the line 34 serving to convey the fluid discharged by the relief valve 7 back to the surge tank 3, and the lines 35 and 36 for conveying pressure fluid from the pilot pump 6 to the servomotor casing 37 of the variable delivery pump 1. The discharge line 38 leads from the servomotor casing 37, back to the surge tank 3.

The variable delivery pump 1 includes a pump casing 40 having a chamber 41 containing bearing pads 42, supporting and guiding the horizontal reciprocation of the pump shiftring or flow-control member 43. The latter, as is well known to those skilled in the art, controls the delivery of the variable delivery pump 1 so as to advance or return the main plunger 12, or to cause it to remain in a neutral position depending upon the eccentricity of the shiftring 43 from its neutral position. Secured, as at 44, to the shiftring 43 is the threaded end 45 of the servomotor piston rod 46, which passes through the bore 47 in the pump casing 40 and carries at its opposite end the piston head 48. The latter reciprocates within the stepped bores 49 and 50 in the servomotor casing 37. The bores 49 and 50 are provided with annular enlargements 51 and 52, having the ports 53 and 54 to which are connected the lines 36 and 38, respectively.

The piston 48 contains a central longitudinal bore 55 which carries a fixed sleeve 56 having ports 57 and 58 opening into its inner bore 59. The piston 48 likewise is provided with ports 60 communicating with the ports 58, and likewise with an annular enlargement 61 of the bore 55 adjacent the port 57. The piston 48 is provided with axially bored passageways 62, running from the left-hand side of the piston 48 to the annular enlargement 61, thereby conveying fluid therebetween but not communicating with the piston port 60. The piston rod 46 contains a longitudinal bore 63, by which the ports 64 communicate with the annular enlargement 52. The piston rod bore 63 is provided with a coil spring 65, one end of which engages the end of the bore 63, and the other end engages the reduced diameter portion 66 of the servomotor control valve rod 67 which carries a valve head 68 movable to and fro within the inner bore 59 of the sleeve 56.

The valve rod 67 passes through a plug 71 carried by a bore 72 in the servomotor cylinder head 73. A packing 74 and gland 75 reduce the fluid leakage around the valve rod 67 communicating with the bore 72. In the motor cylinder head 73 is a leakage duct 76, which is connected to the enlargement 52 by the leakage pipe 77. The latter serves to carry away any fluid leaking past the plug 71. The outer end of the valve rod 67 is provided with a yoke 78, which is pivoted as at 79 to the upper end of a lever 80. The latter is mounted on a pivot pin 81, supported by a link 82 pivotally mounted upon a pin 83 supported in any suitable manner on the servomotor cylinder head 73.

Secured to the side of the pump casing 40 opposite the servomotor casing 37 is a centering device casing made up of two cylinders 85 and 86, secured together in any suitable manner, as indicated at 87, and closed at the extreme end opposite from the casing 40 by a cylinder head 88. The threaded end 89 of the centering shaft 90 is secured to the shiftring 43. This rod terminates at the right-hand end, as seen in Figure 2, in a head or enlargement 91. The casing 85 is provided with an annular inwardly extending flange or shoulder 92, which has an interior diameter somewhat larger than the head 91, as indicated by the spaces 93. A collar 94, loosely mounted on the centering shaft 90 and having an outer diameter such that it fits snugly within the interior of the casing 85, is positioned against the annular flange 92. Around plug 95 of solid construction, of substantially the same size as the collar 94 and therefore adapted to snugly fit the interior of the casing 86, abuts the righthand surface of the annular flange 92. The center of the cylinder head 88 is provided with a port 96 which receives a pipe 97 for supplying fluid pressure to the interior of the casing 86. Similarly, the casing 85 is provided with a port 98 having a pipe 99 communicating therewith for supplying fluid pressure to the interior of the casing 85.

In the operation of the centering device, fluid pressure of a low degree is supplied through these pipes 99 and 97, this fluid pressure being of less amount than the fluid pressure employed for shifting the servomotor piston 48. In this manner the collar 94 and the plug 95, which in effect constitute piston heads, are exposed to the thrust of the fluid pressure within the casings 85 and 86, respectively, but this fluid pressure is insufficient to interfere with the operation of the servomotor piston 48, under ordinary conditions of operation. The fluid pressure for the pipes 99 and 97 may be supplied by an auxiliary pump which is operated from the power source not subject to failure in case the main power source becomes deenergized, or else it may be supplied from a tank or other reservoir for storing fluid under pressure.

The lower end of the lever 80 is pivotally connected through a link and a lever 99' to link 100 (Figure 1), which is pivoted at 101 to the arm 102 of a bellcrank lever 104, which is pivoted at 103. The lever 104 is provided with a rounded yoke 105, which engages the collar 106 on the control rod 17. The other end of the lever 104 is pivoted at 107 to a rod 108, connected to the armature 109 of a solenoid or electromagnet 110. The solenoid 110 may be energized through the wires 111.

The tonnage control valve (Figure 3) consists of a block 116 containing a longitudinal bore 117 reciprocably receiving a plunger 118, the upper end of which carries a head 119 urged downwardly by the coil spring 120, the upper end of which is engaged by the end 121 of the threaded shaft 122, mounted in the threaded bore 123. A hand wheel 124 serves to adjust the position of the threaded shaft 122, thereby varying the force exerted by the coil spring 120 upon the plunger 118. The plunger 118 carries an annular portion 125 reciprocating in the guide chamber 126, leakage being prevented by the packing consisting of the washer 127, packing 128 and gland 129. A limit switch 130 is positioned with its switch arm 131 adapted to be engaged by the head 119 as it moves upwardly when the plunger 118 is shifted by a predetermined pressure exerted against its lower end 132 by pressure fluid arriving along the line 31, leading to the main cylinder bore 20 above the pressing plunger 12. The limit switch 130 is connected in circuit for energizing the solenoid 110 by way of the wires 111. The limit switch 130 is normally closed and thus permits the solenoid 110 to be energized until the plunger 118 of the tonnage control valve 11 rises and opens the switch 130, thereby deenergizing the solenoid 110.

In the operation of the circuit shown in Figures 1 to 3, the solenoid 110 is energized by closing the switch in the usual manner. The energization of the solenoid draws its armature 109 downwardly, this motion being conveyed through the link 108, lever 104, arm 102, link 100 and lever 80 to urge the servomotor control valve rod 67 inwardly. This, in turn, compresses the coil spring 65 and shifts the valve head 68 to the right, permitting pressure fluid from the pilot pump 6 and lines 35 and 36 to pass through the ports 60 and 58, into the inner chamber 59 of the sleeve 56, and thence into the cylinder bore 49 to the left of the stepped piston 48. This pressure forces the servomotor piston 48 and the piston rod 46 to the right, together with the pump shiftring 43. It will be noted that the centering shaft 90 likewise moves to the right, causing its head or enlargement 91 to move the piston head 95 to the right and also to separate from engagement with the piston head 94. The fluid contained in the casing 86 is therefore compressed.

The motion of the servomotor piston 48 causes a corresponding motion of the sleeve 56 in the same direction, thereby causing the ports 57 to pass over and be closed by the valve head 68. The stroke of the valve head 68, however, is arranged to be slightly greater in each direction than the stroke of the servomotor piston 48 so as to allow a small amount of over-travel. While the piston 48 has been moving to the right the fluid within the annular enlargement 52 is discharged through the port 54 and line 38, into the surge tank 3.

With the pump shiftring 43 shifted to the right of its neutral position in this manner, the pump 1 discharges pressure fluid into the space above the main pressing plunger 12 by way of the line 23 and port 21, thereby forcing the plunger 12 downwardly. Ordinarily, the surge valve 5 opens automatically in response to the gravitational descent of the plunger 12 and admits fluid into the space above the plunger 12 from the surge tank 3 until the platen 13 encounters resistance. When this occurs, the surge valve 5 automatically closes and pressure is built up within the main cylinder bore 20. This pressure is transmitted through the line 31, into the chamber 117, where it acts against the lower end 132 of the plunger 118 of the tonnage control valve 11 (Figure 3).

When this pressure is sufficient to overcome the tension in the spring 120, it forces the plunger 118 upwardly, opening the normally closed limit switch 130, and thereby deenergizing the solenoid 110 by breaking its energizing circuit. When the solenoid 110 is deenergized in this manner, the coil spring 65 within the servomotor piston rod 46 forces the servomotor valve rod 67 to the left, causing its head 68 to uncover the ports 57. Fluid then escapes from the left-hand side of the servomotor piston head 48, through the axial passageways 62, into the annular enlargements 61 thence through the ports 58, inner chamber 59 of the sleeve 56, ports 64, annular chamber 52, port 54 and line 38, back to the surge tank 3. While this is occurring, pressure fluid entering the annular chamber 51 from the pilot pressure line 36 engages the right-hand side of the piston head 48 and urges it to the left, consequently moving to the left the servomotor piston rod 46, the pump shiftring 43 and the centering shaft 90. The movement of the centering shaft 90 causes the head or enlargement 91 to move to the left, carrying with it the piston head 94 and causing a compression of the fluid within the casing 85. Thus as the piston 48 is moved to the right of its neutral position, the fluid within the casing 86 is placed under compression by the movement of the piston head 95, and when the piston 48 is moved to the left of the neutral position the fluid in the casing 85 is placed under compression by the left-hand movement of the piston head 94.

The movement to the left of the pump shiftring 43 reverses the delivery of the variable delivery pump 1 and causes pressure fluid to pass through the connection 26, line 24 and port 22, into the main cylinder bore 20 beneath the piston head 12, forcing the platen 13 upwardly. This movement continues until the platen arm 14 lifts the collar 15 and the control rod 17. This motion is transmitted through the lever 104, arm 102, link 100 and lever 80 to the motor control valve rod 67, forcing the latter inwardly to the right through a partial stroke, thereby moving the shiftring 43 of the pump 1 to its neutral position. The pump 1 thereupon ceases to deliver fluid and the platen 13 and plunger 12 remain in a retracted position.

If by a failure of power, or other reason, pilot pressure fails to be delivered through the line 36 when the plunger 12 and platen 13 are in their retracted positions, the weight of these moving parts exerted upon the fluid in the circuit generates pressure fluid, which momentarily runs the pump 1 backward as a motor, and the pump 1 then runs the pilot pump 6 backwardly. As the pilot pump 6 runs backward it sucks the oil out of the line 36 and thus relieves the pressure in the chamber 51. The instant this pressure is relieved the compression within casing 85 or 86, depending on which side of the neutral position the flow-control member or shiftring 43 is stationed, is sufficient to shift the flow-control member or shiftring 43 back to its neutral position. Thus the pistons within the pump 40 are prevented from operating so that the platen 13 and plunger 12 are caused to remain in their retracted position, and hence prevented from creating further pressure fluid which may tend to urge the pump 1 backwardly as a motor. A failure of power, or other reason for cutting off the flow of pilot pressure fluid through the line 36, permits the platen 13 to coast downwardly only a negligible distance before it halts while the press is in its retracted position.

If the press is on its return stroke and the platen 13 moving upwardly, the pilot valve rod 67 is urged to the left by the coil spring 65 within the servomotor piston rod 46, the stroke of this valve rod 67 being slightly greater than the stroke of the servomotor piston 48 and shiftring 43. If now there is a failure of power or failure of pilot pressure fluid from the line 36 while the press platen 13 is executing a return stroke, the above action permits the piston head 94 to move to the right, due to the pressure of the fluid in the casing 85, carrying with it the centering shaft 90 and thereby bringing the shiftring 43 of the pump back to its neutral position. Since the servomotor piston head 48 and its servomotor piston bores 49 and 50 are in constant communication with the lines 36 and 38, entrapment of fluid therein is prevented in the event that a failure of pilot pressure occurs, such as by failure of power to the pilot pump 6.

From the foregoing it is evident that regardless of which side the flow-control member or shiftring 43 happens to be when the power fails, the fluid in one of the casings 85, 86 will be under compression, and this pressure exerted against the piston head 94 or 95 is sufficient to restore the flow-control member to its neutral position. The operation of these piston heads is entirely automatic, and the force exerted thereby becomes immediately available whenever the pressure on either or both sides of the piston head 48 is accidentally relieved.

It will be understood that I desire to comprehend within my invention such modifications as come within the scope of the claims and the invention.

Having thus fully described my invention, what I claim as new and desire to secure by Letters Patent, is:

1. In a hydraulic machine, a pump having a flow-control member, means for shifting said flow-control member to cause said pump to deliver fluid in the forward and reverse directions, and pressure fluid-operated means for moving said flow-control member to its neutral position upon the failure of said shifting means.

2. In a hydraulic machine, a pump having a flow-control member, means for shifting said flow-control member to cause said pump to deliver fluid in the forward and reverse directions, and means including a double-acting piston operable by pressure fluid for returning the flow-control member to its neutral position regardless of whether the flow-control member is in the forward-delivering or reverse-delivering position.

3. In a hydraulic machine, a pump having a flow-control member, means for shifting said flow-control member to cause said pump to deliver fluid in the forward and reverse directions, and means for moving said flow-control member to its neutral position upon the failure of said shifting means, said means including a double-acting piston reciprocable in a cylinder containing pressure fluid and operating to compress the fluid between the piston and one wall of the cylinder when the flow-control member is moved away from neutral.

4. In a variable delivery pump for a hydraulic press, a flow-control member movable in opposite directions to cause said pump to deliver fluid in the forward and reverse directions to said press, a pair of casings secured to said pump on opposite sides thereof, a piston in one of said casings actuated by pressure fluid for moving the flow-control member in opposite directions, and means including a fluid-operated piston in the other of said casings for returning the flow-control member to neutral upon failure of pressure fluid in the piston casing.

5. In a variable delivery pump for a hydraulic press, a flow-control member movable in opposite directions to cause said pump to deliver fluid in the forward and reverse directions to said press, a pair of casings secured to said pump on opposite sides thereof, a piston in one of said casings actuated by pressure fluid for moving the flow-control member in opposite directions, and means including a fluid-operated piston in the other of said casings for returning the flow-control member to neutral upon failure of pressure fluid in the piston casing, said fluid-operated piston being operable to return the flow-control member to neutral position regardless of which side of neutral the flow-control member is positioned when pressure fluid fails.

6. In a variable delivery pump for a hydraulic press, a flow-control member movable in opposite directions to cause said pump to deliver fluid in the forward and reverse directions to said press, casings secured to said pump on opposite sides thereof, a piston in one of said casings actuated by pressure fluid for moving the flow-control member in opposite directions, and means in the other of said casings for returning the flow-control member to its neutral position upon failure of pressure fluid in the piston casing, said means including a double-acting piston operable by pressure fluid, the pressure of said fluid being less than the fluid pressure in the other casing.

7. A safety device for hydraulic pumps with a movable flow-control member comprising a shaft connected to said flow-control member, a projection on said shaft, a piston head movably mounted on said shaft and arranged to engage said projection, a second piston head movable independently of said first piston head and arranged in one position to engage said shaft, and means for supplying pressure fluid to urge said piston heads into engagement with said projection in the neutral position of said flow-control member.

8. A safety device for hydraulic pumps with a movable flow-control member comprising a shaft connected to said flow-control member, a projection on said shaft, a piston head movably mounted on said shaft and arranged to engage said projection, a second piston head movable independently of said first piston head and arranged in one position to engage said shaft, a stop arranged to engage said piston heads in the neutral position of said flow-control member, and means for supplying pressure fluid to urge said piston heads into engagement with said shaft and said stop in the neutral position of said flow-control member.

WALTER ERNST.